(12) United States Patent
Hirata et al.

(10) Patent No.: US 9,217,915 B2
(45) Date of Patent: Dec. 22, 2015

(54) PROJECTION-TYPE VIDEO DISPLAY APPARATUS HAVING A TRANSMISSION-TYPE SCREEN

(75) Inventors: Koji Hirata, Yokohama (JP); Toshihiko Matsuzawa, Kamakura (JP); Tadashi Sato, Fujisawa (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 297 days.

(21) Appl. No.: 13/818,052

(22) PCT Filed: Sep. 30, 2010

(86) PCT No.: PCT/JP2010/067101
§ 371 (c)(1),
(2), (4) Date: Jun. 7, 2013

(87) PCT Pub. No.: WO2012/042643
PCT Pub. Date: Apr. 5, 2012

(65) Prior Publication Data
US 2014/0009694 A1    Jan. 9, 2014

(51) Int. Cl.
*G03B 21/28* (2006.01)
*G03B 21/30* (2006.01)
(Continued)

(52) U.S. Cl.
CPC .............. *G03B 21/28* (2013.01); *G02B 27/283* (2013.01); *G03B 21/10* (2013.01); *G03B 21/30* (2013.01);
(Continued)

(58) Field of Classification Search
CPC ........ G03B 21/10; G03B 21/28; G03B 21/30; H04N 1/00559; H04N 1/00562; H04N 1/1065; H04N 2201/02481

USPC ........ 353/77, 119, 74, 98; 359/449, 460, 443; 348/787, 788, 789, 836, 825, 843
See application file for complete search history.

(56) References Cited

U.S. PATENT DOCUMENTS

| 5,491,585 | A  | * | 2/1996  | Dolgoff        | 359/449 |
| 2003/0011753 | A1 | * | 1/2003  | Sakata et al.  | 353/74  |
| 2010/0290010 | A1 | * | 11/2010 | Hirata et al.  | 353/37  |

FOREIGN PATENT DOCUMENTS

| JP | 2-131087 A   | 5/1990  |
| JP | 5-82181 U    | 5/1993  |
| JP | 5-183847 A   | 7/1993  |
| JP | 7-079398 A   | 3/1995  |
| JP | 11-295816 A  | 10/1999 |

(Continued)

OTHER PUBLICATIONS

International Search Report received in PCT/JP2010/067101 dated Nov. 2, 2010.

*Primary Examiner* — William D Dowling
*Assistant Examiner* — Magda Cruz
(74) *Attorney, Agent, or Firm* — Foley & Lardner LLP

(57) ABSTRACT

A projection-type video display apparatus comprising: a transmission-type screen; a video projection unit configured to project an image displayed on a video display surface as an image light; a projection optic system configured to enlarge and project the image light projected from said video projection unit on a rear surface of said transmission-type screen; and a plane mirror, provided in a part of said projection optic system, configured to reflect the image light from said video projection unit, thereby to project it on said transmission-type screen, wherein said transmission-type screen, said video projection unit and said projection optic system are mounted on a base; said video projection unit builds up an oblique projection optic system; and said transmission-type screen and said plane mirror are disposed on said base, being perpendicularly fixed, independently, in parallel with each other, and on the rear surface of said transmission-type screen is attached a foldable back cover, detachably, so as to cover a rear surface of said plane mirror.

6 Claims, 10 Drawing Sheets

(51) Int. Cl.
  *H04N 1/00*       (2006.01)
  *H04N 1/10*       (2006.01)
  *G02B 27/28*      (2006.01)
  *G03B 21/10*      (2006.01)
  *G03B 21/62*      (2014.01)
  *H04N 9/31*       (2006.01)
  *G02B 3/08*       (2006.01)

(52) U.S. Cl.
  CPC ............ *G03B 21/62* (2013.01); *H04N 1/00559* (2013.01); *H04N 1/00562* (2013.01); *H04N 1/1065* (2013.01); *H04N 9/3173* (2013.01); *G02B 3/08* (2013.01)

(56) References Cited

FOREIGN PATENT DOCUMENTS

| | | |
|---|---|---|
| JP | 2000-199927 A | 7/2000 |
| JP | 2001-251570 A | 9/2001 |
| JP | 2002-247480 A | 8/2002 |
| JP | 2006-018140 A | 1/2006 |
| JP | 2006-227088 A | 8/2006 |
| JP | 2008-076901 A | 4/2008 |
| JP | 2008-083428 A | 4/2008 |
| JP | 2008-209672 A | 9/2008 |
| WO | WO-2007/034711 A1 | 3/2007 |

\* cited by examiner

YZ CROSS-SECTION

XZ CROSS-SECTION

PROJECTION-TYPE VIDEO DISPLAY APPARATUS HAVING A TRANSMISSION-TYPE SCREEN

CROSS REFERENCE TO RELATED APPLICATIONS

The present application is a National Stage of International Application No. PCT/H2010/067101 filed on Sep. 30, 2010. The entire disclosures of which are incorporated herein by reference.

TECHNICAL FIELD

This application relates to a projection-type video display apparatus.

BACKGROUND OF THE INVENTION

As a large-scaled (or large-sized) video display apparatus for enlarging a display screen is already known and is widely utilized a projection-type video display apparatus, which projects a video upon a transmission-type projection surface, through a video projection unit for projecting, with using a video display element, such as, a liquid crystal panel, etc.

Conventionally, for example, in the following Patent Document 1 is already disclosed the structures, in which a mirror, for reflecting the video from the video projection unit thereon, is attached at a predetermined inclination angle, on an inner wall of a rear surface of a housing, standing a projection screen on a front surface, while storing the video projection unit in an inside thereof.

Also, in the following Patent Document 2 is already known a projection display apparatus, which does not need the mirror on a rear-surface side of the projection screen, and in that Patent Document is disclosed that for transmitting or reflecting a video light, being bright and high in contrast even in an oblique projection, in a predetermined direction, with applying a hologram therein.

Further, in the following Patent Document 3 is also already known a rear-surface projection type display apparatus, which reflects a video, so as to project upon the projection screen, by a mirror, being held upright similar to that screen, on a rear surface of the projection screen, while projecting the video on the projection screen, which is held upright in a front surface of the housing, with applying an oblique projection optic system.

PRIOR ART DOCUMENTS

Patent Documents

[Patent Document 1] Japanese Patent Laying-Open No. 2008-76901 (2008);
[Patent Document 2] Japanese Patent Laying-Open No. Hei 11-295816 (1999); and
[Patent Document 3] Japanese Patent Laying-Open No. 2006-18140 (2006).

BRIEF SUMMARY OF THE INVENTION

Problem(s) to be Dissolved by the Invention

However, with such conventional technologies as mentioned above, an improvement is made, sufficiently, in relation to the structures of the housing, for assembling the screen, being a projection surface, the video projection unit for projecting the video, and the mirror for reflecting the video from that video projection unit, thereby to hold them in one body, with the projection-type video display apparatus for projecting the video upon the transmission-type projection surface with applying the video display element therein.

For example, with the video display apparatus disclosed in the Patent Document 1 mentioned above, the housing also becomes large accompanying with large-sizing of the display screen thereof, and for that reason, there is generated difficulty and/or inconvenience, in particular, in transportation/conveyance of that apparatus. Also, since there is necessity of attaching the mirror, for reflecting the video from the video projection unit, on the inner wall of the rear surface of the housing, inclining at the predetermined angle, a required mechanical strength is requested for the inner wall of the rear surface of that housing, and there is also brought about necessity of enhancing the strength of the housing, such as, increasing thickness thereof further, for the purpose of protecting the mirror from being deformed, etc. Moreover, since a desired accuracy for manufacturing is requested in the manufacturing thereof, there is a problem that it results into an increase of manufacturing costs.

However, with the video display apparatus disclosed in the Patent Document 1 mentioned above, such the problem can be dissolved; however, if applying it into the projection-type video display apparatus equipped with the present or existing video projection unit, not applying the hologram therein, it is difficult to obtain the video light, being high in the contrast and bright.

In addition thereto, with the projection display apparatus known by the Patent Document 3 mentioned above, in relation to the structures of the housing, for assembling the screen, being a projection surface, the video projection unit for projecting the video, and the mirror for reflecting the video from that video projection unit, thereby holding them in one body, no sufficient consideration is paid upon such large-sizing of the apparatus accompanying with the large-sizing of the display screen, as was mentioned above, nor further upon the difficulty and/or the inconvenience, in particular, in the transportation/conveyance of the apparatus.

The present invention is accomplished by taking such problems in the conventional technologies mentioned above into the consideration thereof, and an object thereof is to provide a projection-type video display apparatus, having housing structures for dissolving such problems in the conventional technologies mentioned above, i.e., having no difficulty and/or inconvenience in the transportation/conveyance of the apparatus, even if enlarging the size of the display screen, and not bringing about the increase of the manufacturing costs of the apparatus.

Means for Dissolving the Problem(s)

According to the present invention, for accomplishing the object mentioned above, there is provided 1. A projection-type video display apparatus, comprising: a transmission-type screen; a video projection unit, which is configured to project an image displayed on a video display surface as an image light; and a projection optic system, which is configured to enlarge and project the image light projected from said video projection unit on a rear surface of said transmission-type screen, wherein said transmission-type screen, said video projection unit and said projection optic system are mounted on a base, and further a plane mirror, which is provided in a part of said projection optic system, and which is configured to reflect the image light from said video projection unit, thereby to project it on said transmission-type screen, wherein said video projection unit builds up an oblique projection optic system, and further said transmission-type screen and said plane mirror are disposed on said base, being perpendicularly fixed, independently, in parallel with each other, and on the rear surface of said transmission-type screen is attached a foldable back cover, detachably, so as to cover a rear surface of said plane mirror.

Also, according to the present invention, in the projection-type video display apparatus, as described in the above, it is preferable that, in said transmission-type screen and said plane mirror are attached on said base, detachably. Or, further, it is preferable it further comprises a beam member for holding said transmission-type screen and said plane mirror to be in parallel with each other.

And, according to the present invention, in the projection-type video display apparatus, as described in the above, it is preferable that said detachable back cover can be removed from the rear surface of said plane mirror, to be turned back into a plate-like configuration, and in particular, it is preferable that said detachable back cover is built up with, at least one (1) piece of a cover member. Or, it is preferable that said detachable back cover is built up with two (2) pieces of cover members, and on end portions of said two (2) pieces of cover members are attached members connectable with each other.

Effect(s) of the Invention

According to the present invention mentioned above, because of the detachable assembling structures thereof, it is possible to achieve an extremely superior effect of providing a projection-type video display apparatus, having no difficulty and/or inconvenience in the transportation/conveyance of the apparatus, even if the display screen is enlarged in the size thereof, i.e., enabling to decrease an amount of energy and/or carbon dioxide discharged, necessary for the transportation or the conveyance, and also being friendly to the global environment.

EMBODIMENT(S) FOR CARRYING OUT THE INVENTION

Figure 1:
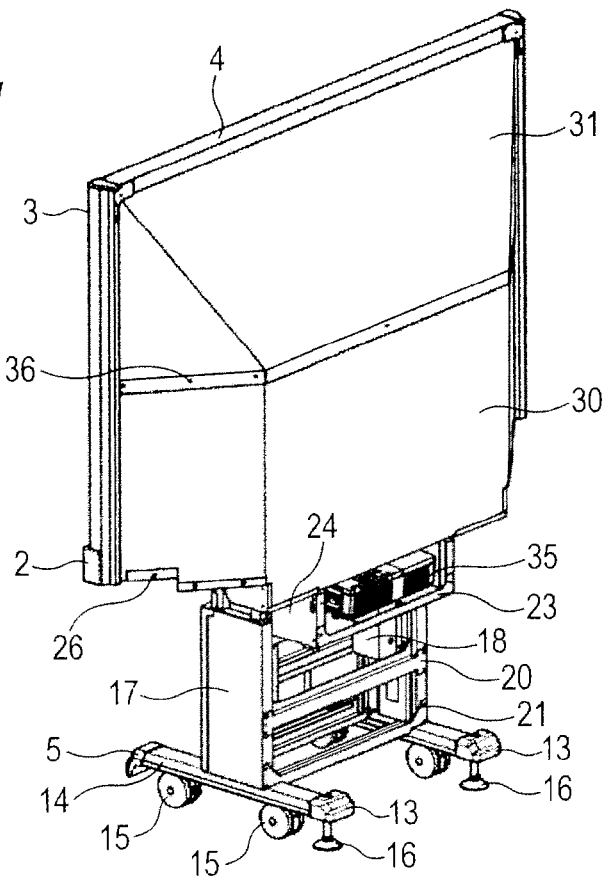
FIG. 1 is a perspective view of an entire of a projection-type video display apparatus, according to an embodiment of the present invention, when being seen from the rear thereof.

Hereinafter, detailed explanation will be made about embodiments, according to the present invention, by referring to the drawings attached herewith. However, in each of the drawings given below, an element(s) having the common function(s) thereof will be shown by attaching the same reference numeral(s), and an explanation of that explained once will omitted, herein, thereafter, for avoiding duplication thereof.

First of all, FIG. 1 attached herewith shows a projection-type video display apparatus, according to an embodiment of the present invention, in the form of a perspective view of the entire thereof when being seen from the rear, and in this figure, a reference numeral 2 depicts a frame body, being attached on a lower end of a screen of a projection type, which builds up a projection surface in that projection-type video display apparatus, a reference numeral 3 frame bodies, being attached on both ends thereof, and a reference numeral 4, being attached on the upper end thereof, respectively. And, on the rear surface side of this screen are attached back covers 30 and 31 for shielding natural lights from an outside entering upon the rear surface of the screen, being foldable housings, and blow that is provided a shelf-like storage portion 24, and further in an inside thereof is disposed a video projection unit 35 for projecting video on that screen. Further, a reference numeral 23 in the figure depicts a "U"-shaped reinforce member, which is attached on a rear end of the shelf-like storage portion 24, and a reference numeral 26, twining with a reference numeral 25, which will be explained later, depicts a member to be attached between the lower end of a mirror, which will be mentioned later, and the lower end of the screen. There are cases where a filter for removing dusts therefrom when an open or outside air passes through may be provided in a block-painted portion of the shelf-like storage portion 24. Also, a reference numeral 36 in this figure shows a member for connecting between the two (2) pieces of the foldable back covers 30 and 31 mentioned above, and as this, for example, a pin and/or a hook-and-loop fastener, etc., can be applied, to be inserted into a though-hole opened in the cover for fixing.

In the lower portion of this screen are disposed a pair of side plates 17 aligning in the vertical direction, as a base or pedestal for mounting that apparatus thereon, and between them are attached reinforcement plates, each being "I"-shaped in an external configuration. And, on lower sides of the pair of side plates are attached leg portions 14, respectively. Further, each of the leg portions 14 is attached with two (2) pieces of rollers 15 and 15, respectively, and with this, the display apparatus as a whole can move on a floor, easily, and further, with a stopper 16 attached in the rear of each leg portion 14, can rest at a desired position. Further, a reference numeral 5 in the figure depicts a safety cover, which is attached in front of each leg portion 14, and a reference numeral 13 depicts a fixing tool of stopper, for attaching the stopper 16 mentioned above in the rear of the leg portion 14. Also, a reference numeral 18 in the figure depicts a storage portion, attached on either one of the pair of side plates 17 mentioned above, for storing an up/down elevating mechanism therein, for example.

Figure 2:
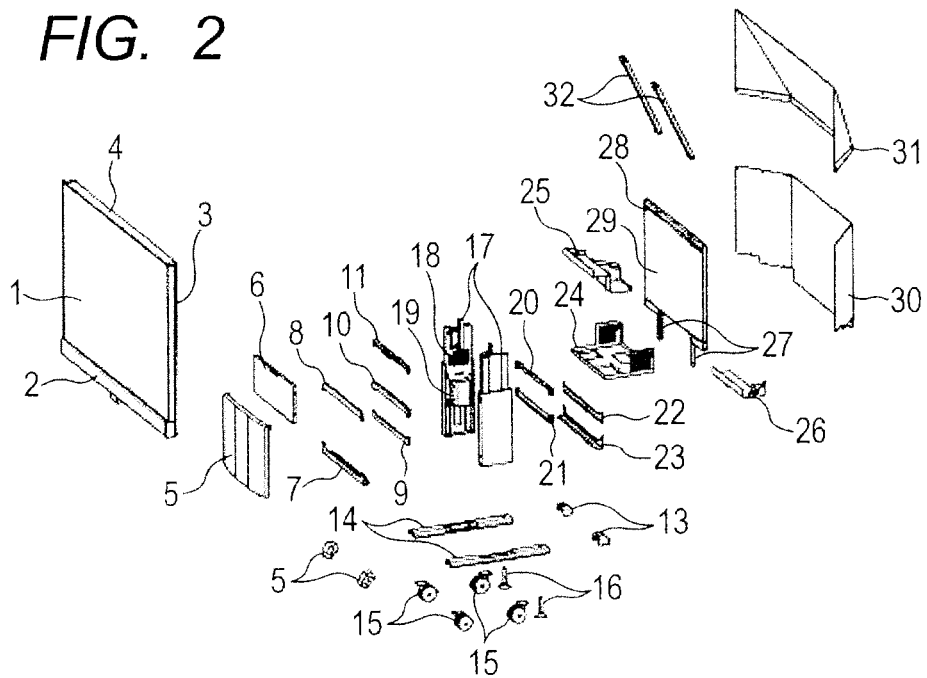
FIG. 2 is an exploded perspective view for showing the projection-type video display apparatus mentioned above, in the condition of being dissembled into individual parts thereof.

Following to the above, FIG. 2 attached herewith shows the projection-type video display apparatus mentioned above, in the condition of being disassembled into individual parts thereof. As apparent from the figure, a transmission-type screen for building up the projection surface is shown by a reference numeral 1, and on the upper/lower ends and both ends thereof are attached the frame bodies 4, 2 and 3, respectively, in one body. Reference numerals 5 and 6 depict boards to be attached on a front edge of the pair of side plates 17, respectively, on a front surface of the display apparatus, and those members are located below the screen 1 mentioned above, and are assembled to be box-like, with an aid of the "I"-shaped reinforcement plates 20 and 21, and further plural numbers of reinforcement plates 7, 8, 9, 10 and 11, each being also "I"-shaped in the outer configuration. Also, the shelf-like storage portion 24 mentioned above defines wall portions on both sides thereof, and on a rear edge portion thereof is attached an "I"-shaped reinforcement plate 22, together with the "U"-shaped reinforcement member 23 mentioned above.

And, in this figure, the mirror mentioned above is shown by a reference numeral 29, and on the upper side of this mirror 29 is attached a frame body 28, and on the lower side thereof is attached a pair of "L"-shaped members, as well. Further, in this figure, the two (2) pieces of foldable housings (e.g., the back covers) 30 and 31 are shown, respectively, being separated from. Also, a reference numeral 32 in the figure depicts a pair of beam members, each being connected with, while linking one end thereof with the frame body 4 of the screen 4 mentioned above and linking the other end thereof with the frame body 28 of the mirror 29 mentioned above. Further, reference numerals 5, 13, 14, 15 and 16 depict the safety cover, the fixing tool of stopper, the leg portion, the roller, and the stopper, respectively.

Figure 3:
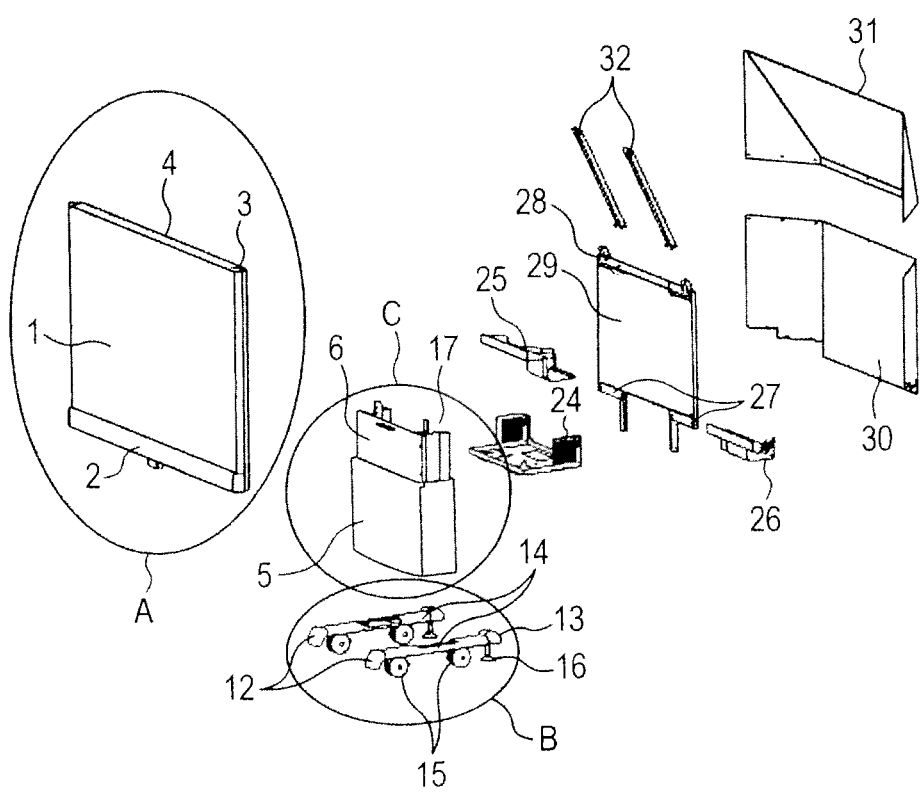
FIG. 3 is a partial exploded perspective view for showing the projection-type video display apparatus mentioned above, in the condition that a part of those individual parts thereof is assembled.

Further, in FIG. 3 attached herewith is shown the condition of assembling a part of those parts mentioned above, thereby building up principle portions for constructing the projection-type video display apparatus. Thus, a mark "A" shows a screen portion including the screen 1 mentioned above therein, "B" a leg portion, and "C" a cabinet portion, respectively. And, as is apparent from the figure, those portions are assembled in one body, and further, in the rear of the cabinet portion "C" is attached the storage portion 24, and the mirror 29 is implanted rising up. Thus, projecting portions of the pair of "L"-shaped members, which are attached on the lower side thereof, are inserted into openings (not shown in the figure) provided in part of the cabinet portion "C". And, in a gap between the lower end of the screen 1 and the lower end of the mirror 29 is attached the pair of members 25 and 26 mentioned above, and between the frame body 4 on the upper end of the screen 1 and the frame body 28 on the upper end of the mirror 29 is fixed the pair of beam members 32 mentioned above. Thereafter, behind the screen 1 mentioned above are attached the housings (i.e., the back covers) 30 and 31, so as to cover the mirror 29 mentioned above and the pair of beam members 32, and thereby assembling of the projection-type video display apparatus is completed. However, in that instance, with applying connecting members, such as, the pin and/or the hook-and-loop fastener, etc., it is possible to attach the back covers 30 and 31, easily, on the frame body 4 of the screen 1 and the frame bodies 3 on both sides thereof.

Figure 4A:
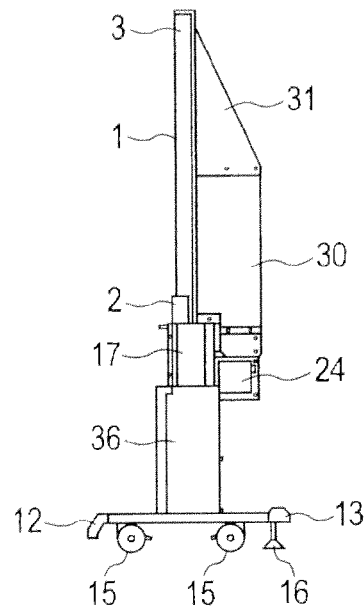
FIGS. 4A and 4B are side views of the projection-type video display apparatus in the completed condition thereof, and that including a cross-section view thereof.
Figure 4B:
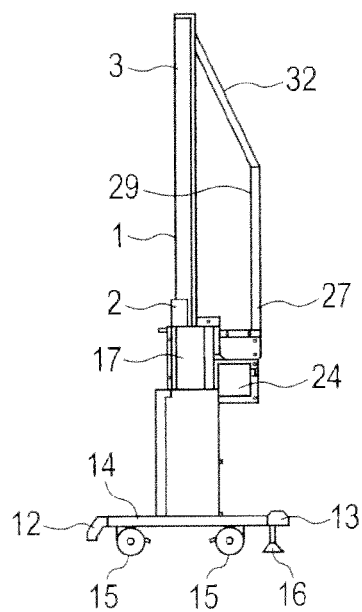

A side surface view of this projection-type video display apparatus completed is shown in FIG. 4A attached herewith, and further a side surface view of the apparatus is shown in FIG. 4B attached herewith, in the condition where the screen 1 and the mirror 29 thereof are cut out in the vertical direction, at a central portion thereof. Thus, as is apparent from those figures, in the projection-type video display apparatus mentioned above, the screen 1 and the mirror 29 are perpendicularly implanted, independently, on the cabinet portion "C" including the pair of side plates 17 raising up from the pair of leg portions 14 (i.e., the pedestal; see FIG. 3), respectively, and further they are arranged and fixed to be in parallel with each other, by the pair of beam members 32 mentioned above. And, the housings (e.g., the back covers) 30 and 31, for covering the screen 1 and the mirror 29 from the rear surfaces thereof, only cover the screen 1 and the mirror 29, which are independently fixed, respectively, from an outer periphery thereof; in other words, being completely different from a concept of the housing within the conventional projection-type video display apparatus, i.e., from the structure (or, the function) of attaching the screen on the housing and then attaching the mirror on that screen at a predetermined angle.

Figure 5A:
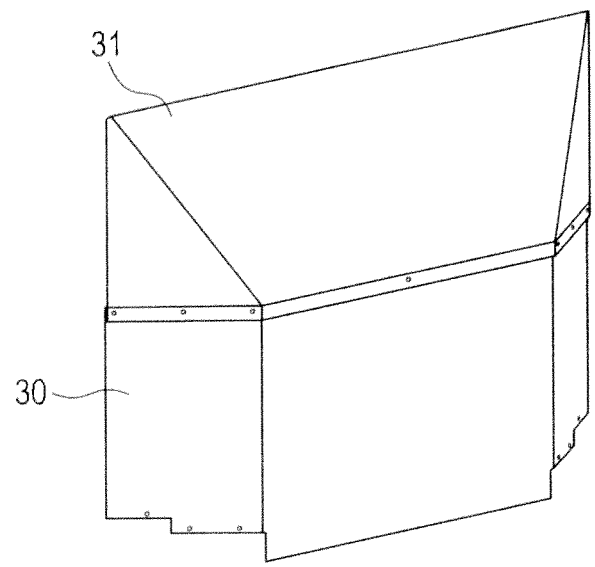
FIGS. 5A and 5B are a perspective view for showing the detailed structures of a housing (i.e., a back cover) of the projection-type video display apparatus mentioned above, and an exploded perspective view thereof.
Figure 5B:
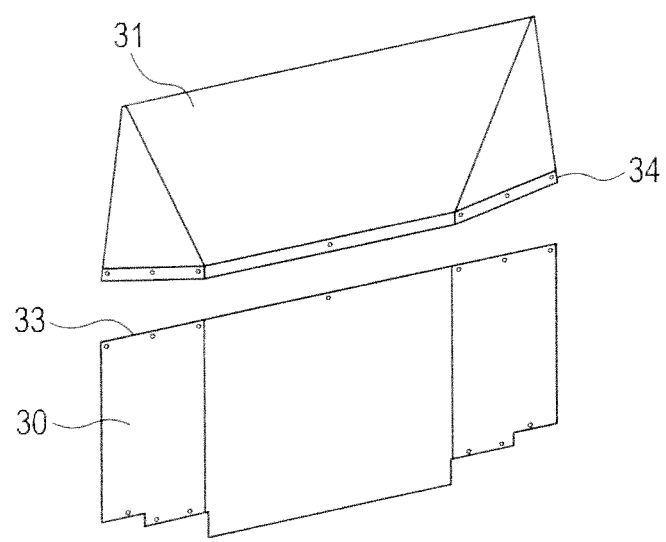

Thus, FIGS. 5A and 5B attached herewith show the housings (e.g., the back covers) 30 and 31 of the projection-type video display apparatus according to the present invention, and in more details thereof, FIG. 5A shows the housings (e.g., the back covers) 30 and 31 under the condition of being attached on the rear surface of the apparatus (or, being folded), and FIG. 5B shows the housings (e.g., the back covers) 30 and 31 in the condition of being turned back to the plates, under the condition of being removed from the apparatus, respectively. Thus, with the conventional projection-type video display apparatus, because of the structure of attaching the mirror at predetermined distance and angle with respect to the screen, with using the housing, that housing come to be large in the outer sizes thereof; however, on the contrary to this, with such structure according to the present invention, as was mentioned above, the housings (e.g., the back covers) 30 and 31 are foldable, and can be removed from and also turned back into the plates. Further, for the housings (e.g., the back covers) 30 and 31, it is preferable to apply a resin material, being light-weight, relatively cheap of the const, soft and superior in the machining property thereof, such as, PVC (polyvinyl chloride), etc., for example.

Figure 6A:
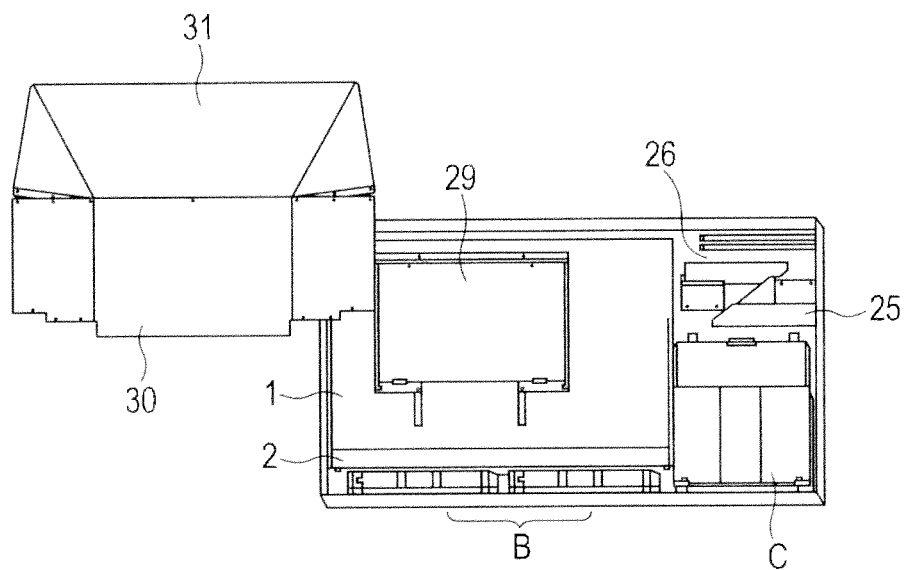
FIGS. 6A and 6B are perspective views for showing an example of the condition of the projection-type video display apparatus, when it is disassembled to be shipped.
Figure 6B:
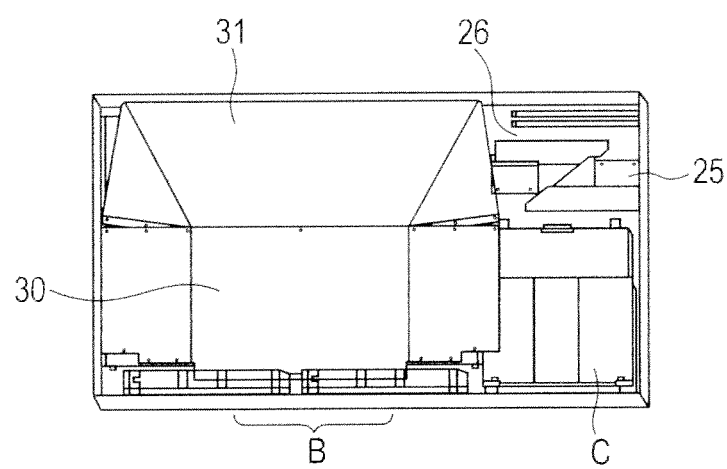

Then, as is shown in FIGS. 6A and 6B attached herewith, for example, when shipping out from a manufacturing factory, if disassembling that projection-type video display apparatus, into such a unit, i.e., the portions and/or parts, as shown in FIG. 3 mentioned above, it is possible to pack that with using a plate-like receiving box, being sufficiently small, and in particular, being thin in the depth thereof, comparing to a carton box, etc., for example, which is used in the packing of the conventional projection-type video display apparatus. Further, FIG. 6A shows the condition before storing the housings (e.g., the back covers) 30 and 31 in the carton box, and FIG. 6B the condition after storing the housings (e.g., the back covers) 30 and 31 in the carton box, respectively. However, the number of those back covers 30 and 31 should not be limited to two (2) pieces, but may be constructed with one (1) piece, or may be constructed with three (3) or more numbers of pieces thereof.

From the above-mentioned, in general, if replacing a portion having the largest volume thereof, i.e., a housing portion, including the screen and the plane mirror therein, and being attached that plane mirror on an interior wall thereof, among the contractual elements building up the projection-type video display apparatus, by the two (2) pieces of the foldable back covers 30 and 31 mentioned above, in the place of the conventional structure, those back covers 30 and 31 can be removed from, easily, and accompanying with that, also the screen 1 and the plane mirror 29 mentioned above can be removed from, easily, and therefore, by disassembling that project projection-type video display apparatus into the portions and/or the parts of the necessary unit (see FIG. 3 and FIGS. 6A and 6B), it can be received in the plate-like receiving box, being relatively small (i.e., being thin in the depth), and thereby can be transported or conveyed, easily. Further, this means that, for example, when shipping out the products, etc., the projection-type video display apparatuses can be moved or transported, by a less number of tracks and cars, comparing to that of the conventional structure, even if the numbers thereof are same to each other, and this reduces an amount of energy and/or carbon dioxide discharged necessary for the movement or the transportation, and is friendly to the global environment.

Following to the above, explanation will be given, hereinafter, on the details of the video projection unit 35 and the screen 1, which are necessary for building up the projection-type video display apparatus according to the present invention mentioned above.

<Optic System of Video Projection Unit>

Figure 7:
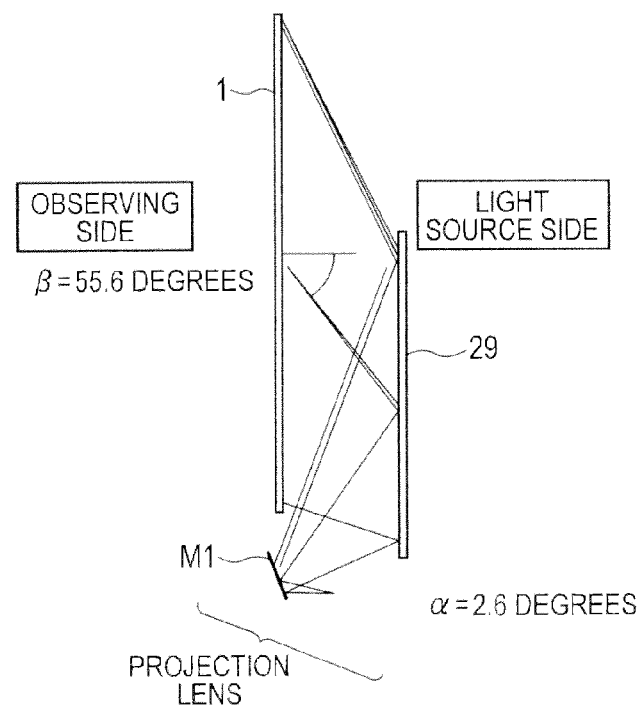
FIG. 7 is a view for explaining a principle of an oblique projection optic system in a video projection unit, which is applicable into the projection-type video display apparatus according to the present invention.

FIG. 7 attached herewith shows the arrangement of the projection lens for achieving the oblique projection optic system, the optical path returning mirror (i.e., the plane mirror 29), and further the transmission-type screen 1, in the video projection unit 35, which is applicable into the projection-type video display apparatus according to the present invention. Thus, this shows the so-called oblique projection optic system, wherein a shifting amount of the optical axis of the objection lens is large, and the lower end of the optical path returning mirror 29 is located below the upper end of a mirror M1 of the projection lens. In more details, by applying that of such oblique projection optic system as the video unit 35 to be applied in the projection-type video display apparatus, it is possible to arrange the optical path returning mirror 29, in the vertical direction as is similar to the transmission-type screen 1, and for that reason, as was mentioned in the above, it is possible to implant the screen 1 and the mirror 29, perpendicularly, on the cabinet portion "C" (see FIG. 3), independently and respectively. However, in the example given in the above, the screen 1 and the mirror 29 are further held by the pair of beam members 32, to be in parallel with each other.

Figure 8:
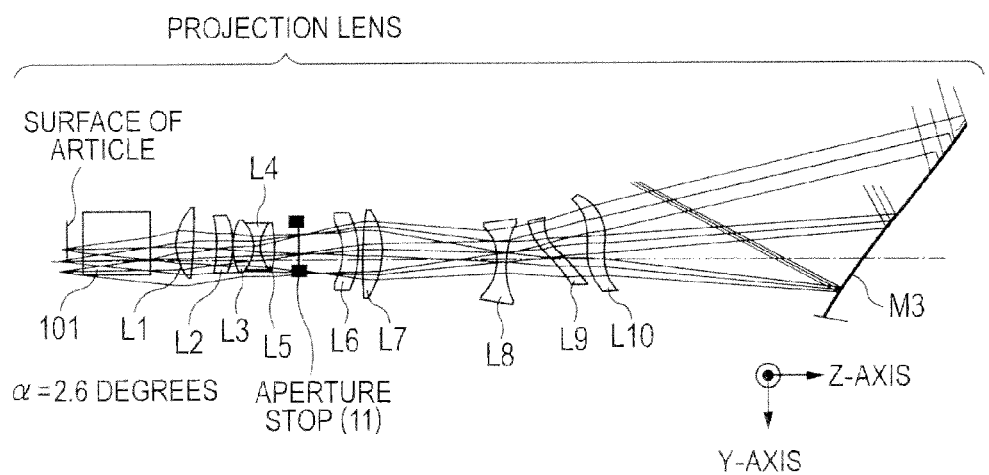
FIG. 8 is a view for showing an example of the detailed structures of projection lenses within the video projection unit mentioned above.
Figure 9A:
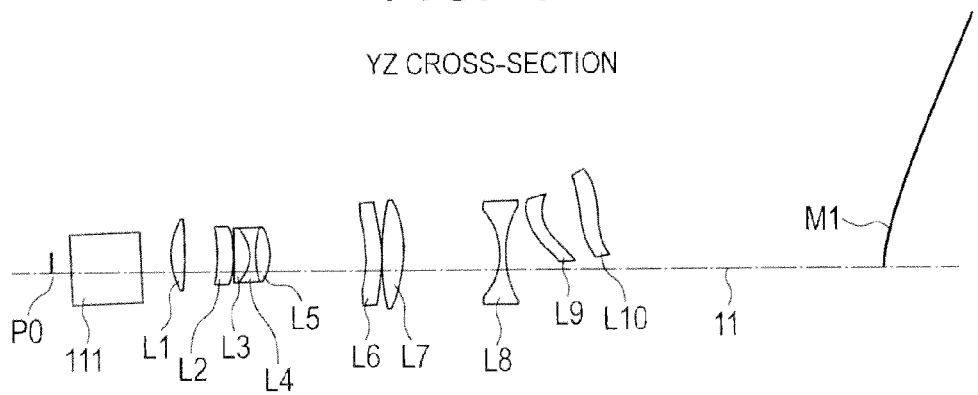
FIGS. 9A and 9B are views for showing an example of the arrangement structures of projection lenses within the video projection unit mentioned above.
Figure 9B:
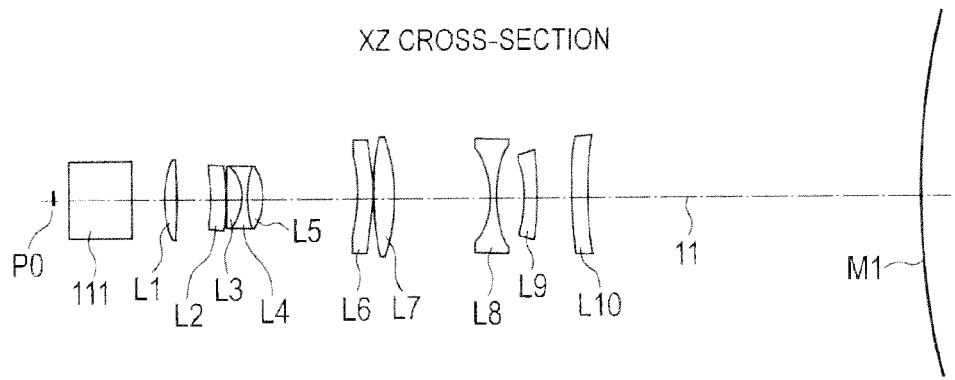

FIG. 8 shows an example of the projection lens shown in the FIG. 7 mentioned above, and further FIGS. 9A and 9B show the Y-Z cross-section and the X-Z cross-section of the projection lens. However, lens data of lenses L1-L10 building up this projection lens is shown in a Table 1 given below.

TABLE 1

| Name | Surface No. | Shape | Radius of Curvature | Distance between Surfaces | Refractive Index/Abbe Number |
|---|---|---|---|---|---|
| Surface of Object | (0) | Sphere | ∞ | 5.977 | |
| Conversion Filer | (1) | Sphere | ∞ | 26.395 | 1.51680/64.20 |
| | (2) | Sphere | ∞ | 11.5465284 | |
| L1 | (3) | Sphere | 40.176 | 4.9 | 1.84666/23.78 |
| | (4) | Sphere | −176.637 | 12.648 | |
| L2 | (5) | Aspheric Surface | −167.959 | 5.89 | 1.5251/56.46 |
| | (6) | Aspheric Surface | −122.832 | 0.300 | |
| L3 | (7) | Sphere | 401.653 | 6 | 1.48749/70.44 |
| L4 | (8) | Sphere | −17.707 | 2 | 1.84666/23.78 |
| L5 | (9) | Sphere | 50.018 | 5.7 | 1.48749/70.44 |
| | (10) | Sphere | −26.002 | 0 | |
| | (11) | Sphere | ∞ | 35.974 | |
| L6 | (12) | Aspheric Surface | −66.6459 | 6 | 1.4909/58.03 |
| | (13) | Aspheric Surface | −62.2313 | 0.3 | |
| L7 | (14) | Sphere | 105.0660 | 8.3 | 1.80610/33.27 |
| | (15) | Sphere | −71.1810 | 36.896 | |
| L8 | (16) | Sphere | 30.4830 | 2 | 1.48749/70.44 |
| | (17) | Sphere | 45.8480 | 19.722 | |
| L9 | (18) | XY Polynomial Surface | ∞ | 6 | 1.4909/58.03 |
| | (19) | XY Polynomial Surface | ∞ | 5.146 | |
| L10 | (20) | XY Polynomial Surface | ∞ | 6 | 1.4909/58.03 |
| | (21) | XY Polynomial Surface | ∞ | 119.906 | |
| M1 | (22) | XY Polynomial Surface | ∞ | 0 | Reflection Surface |
| | (23) | Sphere | ∞ | Z (Separate Table) | |
| Image Surface | (24) | Sphere | ∞ | 0 | |

Further, "Z" indicating a zag amount of lens surface configuration of aspheric lenses L2 and L6 is expressed by the following equation, and aspheric surface coefficients thereof are as shown in a Table 2 given below:

$$Z = \frac{c \cdot h2}{1 + \sqrt{1 - (1 + K)c2 \cdot h2}} + A \times h4 + B \times h6 + C \times h8 + D \times h10 + E \times h12 + F \times h14 + G \times h16 + H \times h18 + J \times h20 \quad \langle\text{Equation 1}\rangle$$

TABLE 2

|  | $5^{th}$ Surface | $6^{th}$ Surface | $12^{th}$ Surface | $13^{th}$ Surface |
|---|---|---|---|---|
| 1/c | −167.959 | −122.832 | −66.6459 | −62.2313 |
| K | 172.744 | 0 | −0.153937 | 0.206380 |
| A | −2.66335E−05 | −2.38519E−05 | 3.76738E−06 | 3.96741E−06 |
| B | 7.92220E−08 | 3.17440E−08 | 1.42797E−08 | 1.09868E−08 |
| C | −5.26342E−10 | −1.61512E−10 | 3.16419E−11 | 1.58678E−11 |
| D | 6.67854E−12 | 3.52176E−12 | −9.44863E−14 | −5.49933E−15 |
| E | 7.04598E−15 | 8.65105−15 | −7.39034E−17 | −1.15325E−16 |

TABLE 2-continued

|  | $5^{th}$ Surface | $6^{th}$ Surface | $12^{th}$ Surface | $13^{th}$ Surface |
|---|---|---|---|---|
| F | −3.43447E−16 | −3.83917E−16 | 1.07298E−18 | 1.50989E−19 |
| G | −5.57170E−19 | −1.00491E−18 | −2.85225E−21 | 7.93244E−22 |
| H | 2.04723E−20 | 3.44806E−20 | 2.57004E−24 | −2.80136E−24 |
| J | −5.52648E−23 | −1.20548E−22 | 1.18394E−29 | 2.53254E−27 |

Also, the "M1" in the figure depicts a mirror forming a free-curved configuration, and the zag amount "Z" thereof is expressed by the following equation, and free-curved configuration coefficients thereof are shown in a Table 3 given below:

$$Z = \frac{c \cdot (x^2 + y^2)}{1 + \sqrt{1 - (1 + K) \cdot c2 \cdot (x^2 + Y^2)}} + \sum\sum Cj(m, n) \cdot x^m \cdot y^n \quad \langle\text{Equation 2}\rangle$$

$$j = [(m+n)2 + m + 3n]/2 + 1$$

TABLE 3

| Code |  | $18^{th}$ Surface | $19^{th}$ Surface | $20^{th}$ Surface | $21^{st}$ Surface | $22^{nd}$ Surface |
|---|---|---|---|---|---|---|
| 1/R | c | 0 | 0 | 0 | 0 | 0 |
| K | K | 0 | 0 | 0 | 0 | 0 |
| C3 | $Y^1$ | 0.751345217 | 0.78007117 | 0.317146197 | 0.282854435 | 0.544526224 |
| C4 | $X^2$ | −0.01758175 | −0.011522589 | 0.00789724 | 0.009148087 | 0.003714338 |
| C6 | $Y^2$ | −0.02124885 | −0.027915463 | 0.019783429 | 0.024311975 | 0.000924242 |
| C8 | $X^2Y$ | 0.000222852 | 0.000410962 | 0.000172737 | 0.000152295 | 6.02681E−05 |
| C10 | $Y^3$ | −0.001815279 | −0.002003168 | 0.000578679 | 0.000810141 | 2.07306E−05 |
| C11 | $X^4$ | −3.08048E−05 | −3.06833E−05 | −1.52049E−05 | −1.69764E−05 | −1.75992E−07 |
| C13 | $X^2Y^2$ | 9.50625E−05 | 7.78647E−05 | −3.37202E−05 | −4.88457E−05 | 7.26017E−07 |
| C15 | $Y^4$ | 3.03736E−05 | 4.75846E−05 | −1.93278E−05 | −1.94222E−05 | 2.93839E−07 |
| C17 | $X^4Y$ | −3.62457E−06 | −3.38545E−06 | −1.38678E−06 | −1.2879E−06 | −5.87712E−09 |
| C19 | $X^2Y^3$ | 1.6436E−06 | −1.30846E−06 | −1.786E−06 | −2.36902E−06 | 6.93373E−09 |
| C21 | $Y^5$ | 2.68751E−06 | 2.23615E−06 | −1.44908E−06 | −1.55877E−06 | 3.7941E−09 |
| C22 | $X^6$ | 1.13872E−07 | 6.93151E−08 | 1.62591E−08 | 1.5632E−08 | 2.56251E−11 |
| C24 | $X^4Y^2$ | −2.76227E−07 | −8.74443E−08 | −2.99468E−08 | 6.47985E−09 | −1.19259E−10 |
| C26 | $X^2Y^4$ | −1.92564E−07 | −1.65778E−07 | −2.12785E−08 | −8.72645E−09 | 2.15129E−11 |
| C28 | $Y^6$ | −4.67109E−10 | −3.89024E−08 | −3.34103E−08 | −2.85206E−08 | 3.73103E−11 |
| C30 | $X^6Y$ | −1.20879E−08 | −1.1772E−08 | 1.27991E−09 | 1.70847E−09 | 7.42243E−13 |
| C32 | $X^4Y^3$ | −1.05915E−08 | 5.64453E−09 | −7.1992E−10 | 2.02511E−09 | −1.71322E−12 |
| C34 | $X^2Y^5$ | −9.46258E−09 | 2.79616E−09 | 7.89308E−10 | 2.41317E−09 | −1.0714E−12 |
| C36 | $Y^7$ | 4.9728E−10 | 5.18671E−10 | −4.36801E−10 | 3.17904E−10 | 4.63964E−13 |
| C37 | $Y^8$ | −1.07985E−10 | −5.10075E−11 | −1.80567E−11 | −1.42035E−11 | −3.16657E−15 |
| C39 | $X^6Y^2$ | −1.19793E−10 | −7.01E−10 | 3.98188E−11 | 3.18713E−11 | 1.31587E−14 |
| C41 | $X^4Y^4$ | 2.80851E−10 | 2.48715E−10 | −4.84574E−11 | 2.46308E−11 | −1.9509E−14 |
| C43 | $X^2Y^6$ | 2.9954E−11 | 2.73242E−10 | 3.81109E−11 | 4.79457E−11 | −2.32612E−14 |
| C45 | $Y^8$ | 6.5869E−11 | 6.47438E−11 | 4.89405E−12 | 2.00339E−11 | 7.93177E−15 |
| C47 | $X^8Y$ | 6.94945E−11 | 4.35876E−11 | −7.8119E−13 | −1.47199E−12 | −6.54372E−17 |
| C49 | $X^6Y^3$ | 3.7162E−11 | −1.70584E−11 | 1.03985E−12 | −7.10612E−13 | 1.49368E−16 |
| C51 | $X^4Y^5$ | 2.86518E−11 | 1.74347E−12 | −2.41585E−12 | −1.94158E−12 | −1.65368E−16 |
| C53 | $X^2Y^7$ | 5.26582E−12 | 7.06206E−13 | 3.20388E−13 | −1.12981E−12 | −1.95843E−16 |
| C55 | $Y^9$ | −2.75688E−12 | −2.04243E−12 | 7.20951E−13 | 2.40184E−13 | 8.07433E−17 |
| C56 | $X^{10}$ | 3.54774E−13 | 2.19244E−13 | 2.49719E−14 | 1.64795E−14 | 7.48982E−20 |
| C58 | $X^8Y^2$ | 3.06388E−12 | 1.72361E−12 | −4.25312E−14 | −5.97791E−14 | −5.10157E−19 |
| C60 | $X^6Y^4$ | 4.36927E−13 | −4.88938E−13 | 2.28321E−14 | −1.05274E−14 | 8.39697E−19 |
| C62 | $X^4Y^6$ | 5.73606E−13 | 4.39862E−14 | −4.41159E−14 | −4.63017E−14 | −7.37124E−19 |
| C64 | $X^2Y^8$ | −9.59911E−15 | −1.02118E−13 | −1.20084E−14 | −3.50914E−14 | −5.89462E−19 |
| C66 | $Y^{10}$ | −1.10234E−13 | −7.22795E−14 | 1.18093E−14 | −1.22963E−15 | 3.12009E−19 |

From the table mentioned above, it can be seen that a conic coefficient "k" is zero (0). A trapezoidal distortion due to an oblique incidence is generated to be large, extremely in the direction of the oblique incidence, but an amount of distortion is small in the direction perpendicular to this. Accordingly, in the direction of the oblique incidence and the direction perpendicular to this, there must be provided functions differing from largely, and without utilizing the above-mentioned conic coefficient "k", being rotationally symmetric and functioning in all directions, it is possible to correct or compensate non-symmetric coefficients, preferably. Also, the surface numbers (18), (19), (20) and (21) are refracting surfaces of the free-curved surface lenses, while the surface number (22) is a reflection surface of the free-curved surface mirror, and they are shown by attaching the names of the configurations beside the surface numbers. Those configurations of the five (5) pieces of free-curved surfaces are presented by the equation 2 mentioned above, and values of the coefficients C(m,n) with respect to each "m" and "n" in the equation mentioned above are shown on a Table 3. Further, two (2) pieces of free-curved surface lenses compensate the trapezoidal distortion generated due to the oblique projection, in cooperation with the free-curved surface mirror "M2" of the reflection mirror system.

<Transmission-Type Screen>

An image light, being projected from the video projection unit of the oblique projection optic system mentioned above, and reflecting upon the plane mirror (i.e., the optical path returning mirror) 29 mentioned above, after incident upon the rear surface of the transmission-type screen, which will be mentioned hereinafter, exits directing to an observing side. Further, as this transmission-type screen can be used that of the linear Fresnel type, or that of the circular Fresnel type, as will be mentioned hereinafter.

Figure 10A:
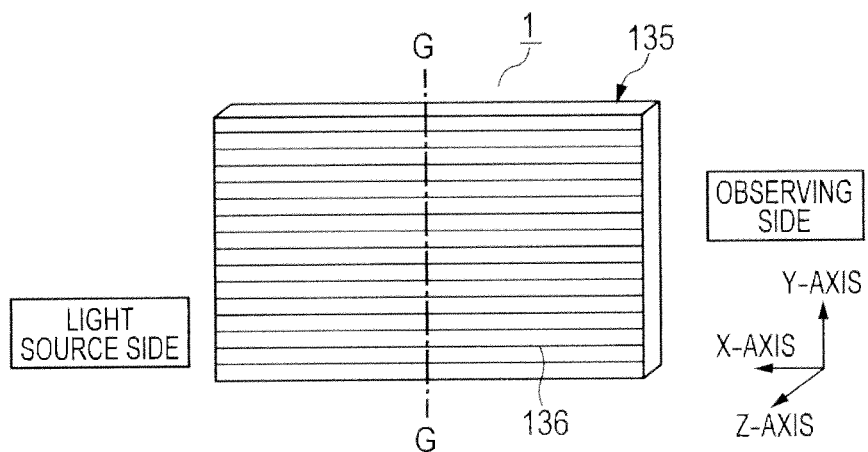
FIGS. 10A and 10B are views, including a cross-section view, for showing the detailed structures of a screen of a linear Fresnel type, which builds up a transmission-type screen in the projection-type video display apparatus mentioned above.
Figure 10B:
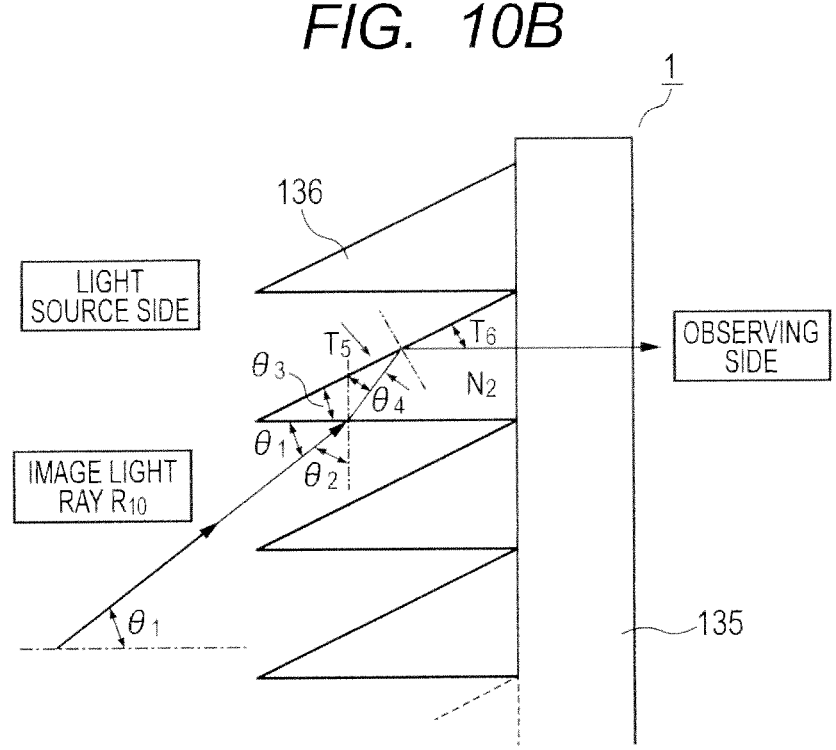

FIGS. 10A and 10B show the detailed structures the transmission-type screen of the linear Fresnel type, and as is apparent from those figures, this screen is constructed with a diffusion layer, including a diffusing material not shown in the figure, and a hardened surface layer (i.e., a hard coating layer) for protecting that from being injured, on the surface facing to the observing side, and also, a Fresnel sheet substrate 135 forming a large numbers of the linear Fresnel lenses 136 in parallel direction, on the surface to the light source side (i.e., inside the housing). With the transmission-type screen of such linear Fresnel type, as is apparent from the figures, it is possible to exit the image light, projecting from the video projection unit of the oblique projection optic system, towards the observing side.

With the transmission-type screen of such linear Fresnel type, it is possible to increase mass-productivity and to obtain reduction of manufacturing cost thereof, through pushing out a Fresnel sheet substrate under the condition of being flat, being wound like a roll, by means of a sheet sending machine, while applying a resin curable by ultraviolet rays, visible lights or electron beams, on one surface of the sheet surfaces, and forming and hardening Fresnel lens forms with using a linear Fresnel forming roll. Also, as a material thereof can be listed up the following candidates having high permeability or transmittance: i.e., polycarbonate, polyethylene terephthalate (PET), polypropylene, etc.; however, if taking the stability of size thereof into the consideration, it is preferable that the material has a low hygroscopicity (or moisture absorbency), such as, polycarbonate, polyethylene terephthalate (PET), etc. Also, as the screen substrate is preferable the followings: i.e., acryl, polycarbonate, polystyrene, etc.

Figure 11A:
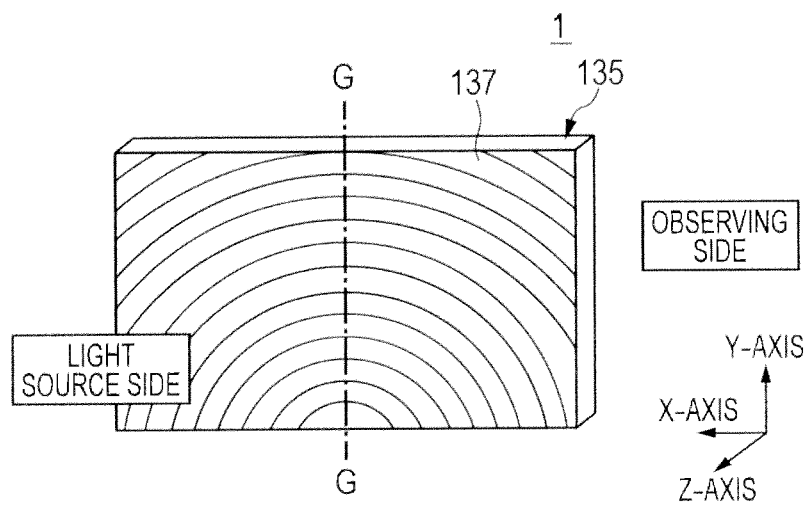
FIGS. 11A and 11B are views, including a cross-section view, for showing the detailed structures of a screen of a circular Fresnel type, which builds up a transmission-type screen in the projection-type video display apparatus mentioned above.
Figure 11B:
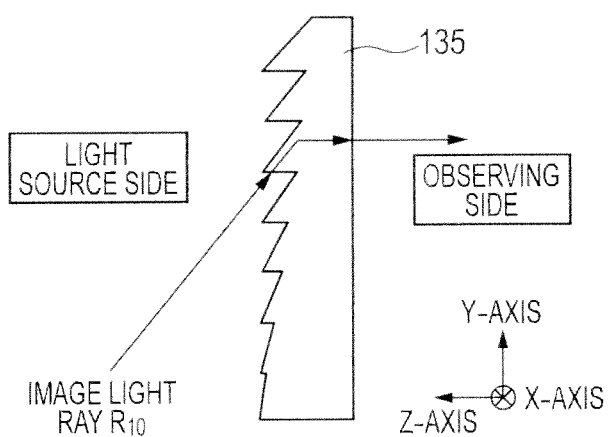

FIGS. 11A and 11B show the detailed structures of the transmission-type screen of the circular Fresnel type. Thus, with such transmission-type screen of the circular Fresnel type, similar to the transmission-type screen of the linear Fresnel type mentioned above, it is possible to exit the image light rays, which are projected from the video projection unit of the oblique projection optic system.

<Entire Structures of Video Projection Unit>

Figure 12:
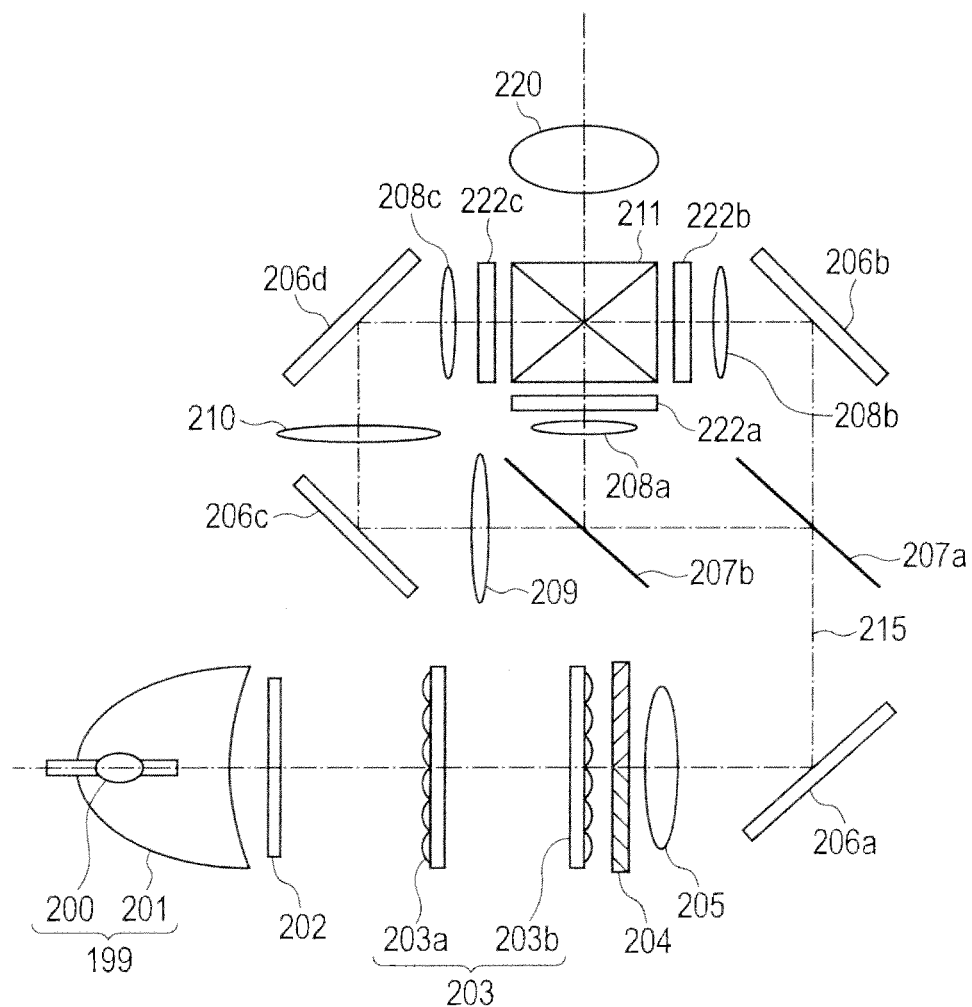
FIG. 12 is a block diagram for showing an example of the entire structure of the projection-type video display apparatus mentioned above.

Next, explanation will be given on an example of the entire structures of the video projection unit mentioned above, by referring to FIG. 12 attached herewith. In FIG. 12, a light source 199 is made of a lamp tube 200 and a reflector 201. This lamp 199 is a white-color lamp of a high-pressure mercury lamp. Also, the reflector 201 has a reflection surface, for example, having a rotary parabolic surface configuration, which is disposed to cover the lamp 200 from the behind thereof, and has a circular or polygonal exit opening. And, the light emitting from this lamp tube 200 is reflected upon the reflector 201, having the rotary parabolic surface configuration, and is emitted to be a light flux, being in parallel with an optical axis, approximately, to be emitted. The light emitting from the light source 199 enters upon an integrator of multi-lens type.

As was mentioned above, the multi-lens type integrator 203 is constructed with a first multi-lens element 203a and a second multi-lens element 203b. Further, the lens cell of the first multi-lens element 203a has a rectangular configuration, being almost similar to that of the liquid crystal panels 222a, 222b and 222c, seeing it into the direction of the optical axis 215, and it is made up by providing plural numbers of lens cells in a matrix-like manner, wherein the light entering from the light source is divided into plural numbers of lights by the plural numbers of lens cells, and thereby to be guided to pass through the second multi-lens element 203b and a polarized light converting element 204, effectively. Thus, the first multi-lens element 203a is so designed that the lamp tube 200 and the respective cells of the second multi-lens cells are in an optically conjugate relationship.

The lens cell configuration of the second multi-lens element 203b has a rectangular configuration, similar to the first multi-lens cell element 203a, seeing it into the direction of the optical axis 215, and has the structure of providing plural numbers of lens cells in the matrix-like manner, and the lens cells building up that lens element project (or image) the corresponding lens cell configuration of the first multi-lens element 203a, respectively, upon the liquid crystal panels 222a, 222b and 222c, as well as, upon superposing lenses 208a, 208b and 208c. And, in this course, because of the function of the polarized light converting element 204, the lights from the second multi-lens element 203b are completed into a predetermined polarization direction. At the same time, projection images, being formed by means of the lens cell of the multi-lens element 203a, are superposed, respectively, due to the functions of the superposing lenses 208a, 208b and 208c, and therefore, distribution of an amount of light on the liquid crystal panels 222a, 222b and 222c corresponding thereto comes to be uniform.

EXPLANATION OF MARKS

1 . . . projection-type screen, 17 . . . sideplate, C . . . cabinet portion, 29 . . . plane mirror (optical path returning mirror), 30, 31 . . . housing (back cover), 32 . . . beam member, 35 . . . video projection unit, 36 . . . connecting member.

What is claimed is:

1. A projection-type video display apparatus, comprising:
a transmission-type screen;
a video projection unit, which is configured to project an image displayed on a video display surface as an image light;
a projection optic system, which is configured to enlarge and project the image light projected from said video projection unit on a rear surface of said transmission-type screen; and
a plane mirror, which is provided in a part of said projection optic system, and which is configured to reflect the image light from said video projection unit, thereby to project it on said transmission-type screen, wherein
said transmission-type screen, said video projection unit and said projection optic system are mounted on a base;
said video projection unit builds up an oblique projection optic system; and
said transmission-type screen and said plane mirror are disposed on said base, being perpendicularly fixed, independently, in parallel with each other, and on the rear surface of said transmission-type screen is attached a foldable back cover, detachably, so as to cover a rear surface of said plane mirror.

2. The projection-type video display apparatus, as described in the claim 1, wherein said transmission-type screen and said plane mirror are attached on said base, detachably.

3. The projection-type video display apparatus, as described in the claim 1, further comprising a beam member for holding said transmission-type screen and said plane mirror to be in parallel with each other.

4. The projection-type video display apparatus, as described in the claim 1, wherein said detachable back cover can be removed from the rear surface of said plane mirror, to be turned back into a plate-like configuration.

5. The projection-type video display apparatus, as described in the claim 1, wherein said detachable back cover is built up with, at least one (1) piece of a cover member.

6. The projection-type video display apparatus, as described in the claim 5, wherein said detachable back cover is built up with two (2) pieces of cover members, and on end portions of said two (2) pieces of cover members are attached members connectable with each other.

* * * * *